United States Patent [19]

Carpenter et al.

[11] Patent Number: 5,231,134
[45] Date of Patent: Jul. 27, 1993

[54] PROCESS FOR THE PREPARATION OF AN AMINE MODIFIED COPOLYMER AS A PIGMENT DISPERSANT FOR CATHODIC ELECTROCOATING COMPOSITIONS

[75] Inventors: Clint W. Carpenter, Royal Oak; Alan L. Steinmetz, Milford, both of Mich.

[73] Assignee: BASF Corporation, Parsippany, N.J.

[21] Appl. No.: 751,025

[22] Filed: Aug. 29, 1991

[51] Int. Cl.$^5$ .......................... C08F 8/30; C08L 75/00
[52] U.S. Cl. .................................... 525/123; 525/125; 525/126; 525/127
[58] Field of Search ................. 525/123, 125, 126, 127

[56] References Cited

U.S. PATENT DOCUMENTS

| | | | |
|---|---|---|---|
| 4,565,852 | 1/1986 | Qaderi | 525/528 |
| 4,624,762 | 11/1986 | Abbey et al. | 524/507 |

*Primary Examiner*—John Kight, III
*Assistant Examiner*—Dve Truong
*Attorney, Agent, or Firm*—Frank G. Werner; Paul L. Marshall

[57] ABSTRACT

The present invention is directed to a process for the preparation of amine modified copolymers as a pigment dispersant for cathodic electrocoating compositions comprising the steps of a) polymerizing
  i) an ethylenically unsaturated monomer containing an isocyanate group with
  ii) other ethylenically unsaturated monomers having no functional group capable of undergoing a reaction with said isocyanate group to form a copolymer with isocyanate groups and b) reacting stepwise or simultaneously said isocyanate groups with
  iii) a compound selected from the group consisting of a polyalkyleneglycol monoalkyl ether, an amino-terminated polyalkylene glycol monoalkyl ether and mixtures thereof and
  iv) a compound containing at least a tertiary amine group and one functional group capable of undergoing a reaction with said isocyanate group and
  v) optionally, another compound having one functional group capable of undergoing a reaction with said isocyanate group.

8 Claims, No Drawings

5,231,134

PROCESS FOR THE PREPARATION OF AN AMINE MODIFIED COPOLYMER AS A PIGMENT DISPERSANT FOR CATHODIC ELECTROCOATING COMPOSITIONS

FIELD OF THE INVENTION

The present invention is directed to a process for the preparation of an amine modified copolymer, more specifically it is directed to an amine modified copolymer as a pigment dispersant for a cathodic electrocoating composition.

BACKGROUND OF THE INVENTION

Cathodic electrodeposition as a coating application method for metallic substrates is well known and described for example in U.S. Pat. Nos. 4,575,523; 4,661,541; 4,780,524 and 4,920,162.

The electrocoating composition comprises a principal resin, a crosslinker, a grind resin, pigments and other additives such as solvents, control agents, fillers and the like.

Typically, a principal resin is prepared by adducting an epoxy resin with an amine. An aqueous electrodeposition coating bath is prepared by mixing the principal resin with a crosslinking agent and salting it with acid and deionized water to form a dispersion, mixing the dispersion with a pigment paste and optionally with other additives like solvents, antifoam and the like.

Pigment pastes are usually prepared by dispersing a pigment in a grinding resin in the presence of plasticizers, wetting agents, surfactants or other ingredients in a ball mill, sand mill, cowles mill or continuous mill until the pigment has been reduced to the desired particle size and is wetted by the resin or dispersed in it.

One disadvantage of pigment pastes is that they contain volatile organic compounds (VOC).

It is therefore an object of the present invention to provide a process for the preparation of a pigment dispersant for a cathodic electrocoating composition which does not need the use of volatile organic compounds and which provides stable aqueous pigment pastes or pigment dispersions. Another object of the invention is an aqueous cathodic electrocoating composition.

SUMMARY OF THE INVENTION

The objects of the present invention are achieved with a process for the preparation of amine modified copolymers as pigment dispersants for cathodic electrocoating compositions comprising the steps of
a) polymerizing
  i) an ethylenically unsaturated monomer containing an isocyanate group with
  ii) other ethylenically unsaturated monomers having no functional group capable of undergoing a reaction with said isocyanate group to form a copolymer with isocyanate groups and
b) reacting stepwise or simultaneously said isocyanate groups with
  iii) a compound selected from the group consisting of a polyalkyleneglycol monoalkyl ether, an amino-terminated polyalkylene glycol monoalkyl ether and mixtures thereof and
  iv) a compound containing at least a tertiary amino group and one functional group capable of undergoing a reaction with said isocyanate group and
  v) optionally, another compound having one functional group capable of undergoing a reaction with said isocyanate group.

DETAILED DESCRIPTION OF THE INVENTION

In step (a) of the process of the present invention, a copolymer with isocyanate groups is formed by polymerizing
  i) from about 5 to about 50% by weight, preferably from about 20 to about 30% by weight of an ethylenically unsaturated monomer containing an isocyanate group with
  ii) from about 50 to about 95% by weight, preferably from about 70 to about 80% by weight of another ethylenically unsaturated monomer having no functional group capable of undergoing a reaction with said isocyanate group.

Suitable ethylenically unsaturated monomers containing an isocyanate group (i) comprise dimethyl-meta-isopropenyl benzyl isocyanate, vinylisocyanate, isocyanatoethyl(meth)acrylate, isopropenyl isocyanate and mixtures thereof. Preferred is dimethyl-meta-isopropyl benzyl isocyanate.

Ethylenically unsaturated monomers (ii) are suitable if they have no functional group capable of undergoing a reaction with said isocyanate group of monomers (i). These monomers may be chosen from acrylic or methacrylic alkyl, aryl, aralkyl, alkoxyalkyl or aryloxyalkyl esters derived from alcohols or phenols having to about 20 carbon atoms, or vinyl monomers. The expression (meth)acrylate with parentheses as used herein includes methacrylate and acrylate. Suitable examples are methyl (meth)acrylate, ethyl (meth)acrylate, propyl (meth)acrylate, n-butyl (meth)acrylate, isobutyl (meth)acrylate, tert-butyl (meth)acrylate, cyclohexyl (meth)acrylate, 2-ethylhexyl (meth)acrylate, phenyl (meth)acrylate, para-tolyl (meth)acrylate, phenyethyl (meth)acrylate, 3-phenylpropyl (meth)acrylate, ethoxyethyl (meth)acrylate, phenoxyethyl (meth)acrylate, and mixtures thereof. Also suitable are maleic acid and fumaric acid dialkyl esters in which the alkyl groups have 1 to 20 carbon atoms. Other suitable monomers are vinyl aromatics such as styrene, alphamethyl styrene and vinyl toluene, halogenated vinyl benzenes such as chlorostyrene, and other vinyl monomers such as vinyl chloride, (meth)acrylamide and N-alkyl and N-aryl substituted (meth)acrylamides, (meth)acrylonitrile, N-alkyl maleimides, N-aryl maleimides, and acrolein.

Preferred are styrene, phenyl(meth)acrylate, N-butyl (meth)acrylate, cyclohexyl (meth)acrylate, 2-ethylhexyl (meth)acrylate and (meth)acrylonitrile.

Copolymerization is carried out using conventional techniques such as heating the monomers in the presence of a polymerization initiating agent and optionally chain transfer agents. The copolymerization may be carried out in bulk or solution. For the present invention it is preferred to have some solvent present to act as a cosolvent during dispersion. Solvents for solution polymerization should not have functional groups capable to react with the isocyanate groups of component (i).

Suitable solvents comprise ketones, such as methyl ethyl ketone, methyl propyl ketone and acetone; esters, such as butyl acetate and pentyl propionate; ethers, such as diethylene glycol dimethyl ether, dioxane, tetrahydrofuran; N-methyl pyrrolidone, ketoesters, aromatic hydrocarbons, alkanes, cyclic alkanes, and mixtures thereof.

Preferred solvents are ketones such as methyl ethyl ketone, methyl propyl ketone, and methyl isobutyl ketone methyl amyl ketone and mixtures thereof.

Typically initiators are peroxides such as dialkyl peroxides, peroxyesters, peroxydicarbonates, diacyl peroxides, hydroperoxides, and peroxyketals and azo compounds such as 2,2'-azobis(2-methylbutanenitrile) and 1,1'-azobis (cyclohexanecarbonitrile).

Typical chain transfer agents are mercaptans such as octyl mercaptan, n- or tert.-dodecyl mercaptan; halogenated compounds; thiosalicylic acid, mercaptoacetic acid, mercaptoethanol, buten-1-ol, and dimeric alphamethyl styrene. Mercaptans are preferred.

The reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be between one minute and thirty minutes.

The solvent or solvent mixture is generally heated to the reaction temperature and the monomer and initiator(s) are added at a controlled rate over a period of time, usually between 2 and 6 hours. A chain transfer agent or additional solvent may be fed in also at a controlled rate during this time. The temperature of the mixture is then maintained for a period of time to complete the reaction. Optionally, additional initiator may be added to ensure complete conversion.

The NCO number of the copolymer is from about 0.3 meqg NV to 2.0 meqg NV, preferably from about 0.9 meqg NV to about 1.5 meqg NV.

The copolymers of step (a) have a weight average molecular weight determined by GPC versus polystyrene standards of from about 3,000 to about 25,000, preferably from about 4,000 to about 10,000.

In step (b) the isocyanate groups of the copolymer of step (a) are reacted stepwise or simultaneously with (iii) a polyalkylene glycol monoalkyl ether or an amine-terminated polyalkylene glycol monoalkyl ether, (iv) a compound containing at least one tertiary amino group and one functional group capable of undergoing a reaction with said isocyanate group and (v) optionally another compound having one functional group capable of undergoing a reaction with said isocyanate group.

The polyalkylene glycol monoalkyl ether (iii) is preferably formed from monoalcohol initiated polymerization of ethylene oxide, propylene oxide and mixtures thereof with up to 30% by weight propylene oxide. Starting monoalcohols are $C_1$–$C_{18}$ alcohols like metnanol, ethanol, n-propanol, i-propanol hexanol, decanol, undercanol and etheralcohols like methoxyethanol, butoxyethanol and the like.

The amine-terminated polyalkylene glycol monoalkylether is preferably formed from the amination of polyalkylene glycol monoalkyl ether.

The polyalkylene glycol monoalkyl ethers have molecular weights of from 300 to 20,000, preferably 1,000 to 2,500.

Preferred is polyethylene glycol monomethyl-ether.

Suitable compounds (iv) contain at least one tertiary amino group and one functional group capable of undergoing a reaction with the isocyanate group of the copolymer of step (a).

Examples of these compounds are alkanolamines containing at least one tertiary amino group and one hydroxyl group like N,N dimethyl ethanolamine, N,N diethyl ethanolamine, N,N dimethyl propanolamine,N-hydroxyethylpiperidine, N-hydroxyethylpyrrolidine and the like. Another group are amines containing at least one tertiary amino group and one primary or secondary amino group like N,N dimethyl propanediamine, N,N dimethyl ethanediamine, N,N dimethyl hexanediamine, N-methyl piperazine, aminoethylmorpholine and aminoethylpiperidine.

Other suitable compounds comprise hydroxyethylpyridine and aminoethylpyridine.

Preferred are N,N-dimethylpropanediamine and N,N-dimethylethanolamine.

Examples of compounds (v) are $C_1$–$C_{36}$ mono or dialkyl amines such as ethylamine, n-propylamine, i-propylamine, n-hexylamine, 2-ethylhexylamine, n-decylamine, stearylamine, diethylamine, dihexylamine, distearylamine, N-methyl-N-ethylamine; $C_4$–$C_{18}$ a mono or dicycloaklylamines such as cyclopentylamine, cyclohexylamine, dicyclohexylamine; heterocyclic $C_4$–$C_{18}$ amines such as pyrrolidine, piperidine and morpholine, aromatic $C_6$–$C_{18}$ amines such as aniline, p-toluidine, o-toluidine, diphenylamine, indole and indoline; araliphatic $C_7$–$C_{18}$ amines like benzylamine, dibenzylamine, 2-phenylethylamine; $C_2$–$C_{36}$ mono- and dialkanolamines like ethanolamine, diethanolamine, i-propanolamine, h-hexanolamine, h-undecandamine, 3-aminopropanol, aminocyclohexanol and 2-(2-aminoethoxy)ethanol; $C_1$–$C_{36}$ alcohols such as methanol, ethanol, propanol, i-propanol, n-butanol, isobutanol, n-hexanol, cyclohexanol, 2-ethylhexanol; $C_3$–$C_{36}$ ether alcohols such as methoxyethanol, butoxyethanol, 1-butoxy-2-propanol, and (butoxyethoxy)ethanol.

Preferred are mono- and di- alkanolamines, particularly ethanolamine, diethanolamine, and 3-aminopropanol.

As stated above, the components (iv) and (v) may be reacted one after another or simultaneously with the isocyante groups of the copolymer of step (a). Preferred is the stepwise reaction of first component (iv) and second component (v).

The reaction is usually carried out at temperatures from about 20° C. to 150° C., preferably from about 50° C. to about 130° C.

The molar ratio of the hydrogen functionality of component (iv) and (v) to the isocyanate group of the copolymer of step (a) is from about 0.8 to about 1.3, preferably from about 1.0 to about 1.3.

The reaction may be carried out in the presence of the same organic solvents which have been used in step (a) and in the presence of a catalyst such as organic tin compounds and/or tertiary amine.

The final amine modified copolymers have a weight average molecular weight of from about 4,000 to about 30,000, preferably from about 5,000 to about 12,000.

For the preparation of the pigment paste, the pigments or dyestuffs are dispersed in a solution of the copolymer in water with optional cosolvent and ground in a ball mill, sand mill, cowles mill, attritor, or continuous mill.

Examples of the dye stuffs or pigments may be inorganic or organic, for example, graphite, carbon black, zinc chromate, strontium chromate, barium chromate, lead chromate, lead cyanide, titanium dioxide, zinc oxide, iron oxide, cadmium sulfide, iron oxide, aluminum flakes, mica flakes, zinc sulfide, phthalocyanine complexes, naphthol red, carbazole violet, perylene reds, quinacridones and halogenated thioindigo pigments, among others.

The pigment paste has a concentration of from about 10 to about 60% by weight, the optimum concentration of which depends on pigment type and particle size.

The pigment paste of the present invention is added to an aqueous cathodic electrocoating composition comprising a principal resin, which has been solubilized by an acid, a crosslinker and additives in a known manner.

The concentration of the pigment paste is from about 1 to about 10% by weight, preferably from about 2 to about 5% by weight, based on the total weight of the aqueous cathodic electrocoating composition.

The principle resin is known in the art and described for example in U.S. Pat Nos. 4,575,523; 4,661,541 and 4,780,524. It constitutes a self-addition aromatic or alkyl aromatic epoxy resin with at least one epoxy group with at least one amine with at least one primary or secondary amino group. A particularly useful class of polyepoxides are the glycidyl polyethers of polyhydric phenols like glycidyl polyethers of bisphenol A having epoxide equivalent weights of from about 450 to about 2,000, more typically from about 800 to about 1.600, and preferably from about 800 to about 1,500.

Typical preferred commercial formulations of diglycidyl ether starting materials are sold under the trade names "EPON 828" and "EPON 1001" (Shell Chemical Co., Division of Shell Oil Company, 50 West 50th Street, New York, N.Y.), Araldite GY 2600 (CibaGeigy, Division of Ciba Corporation, Fair Lawn, N.J.), or DER 632 (Dow Chemical Co., Midland, Mich.).

Examples of amines with at least one primary or secondary amine group include aliphatic diamines and triamines, aliphatic alcohol amines, alkylene diamines, alkanol amines and N-alkyl substituted forms thereof. Especially preferred are the aliphatic diamines and alcohol amines having 1 to 10 carbons in the aliphatic group.

Examples for diamines are ethylene diamine, 1,2-propylene diamine, 1,3-propylene diamine, 1,2-butylene diamine, 1,3-butylene diamine, 1,4-butylene diamine, 1,5-pentalene diamine, 1,6-hexylene diamine, 1,4-diaminocyclohexane, methyl-aminopropylamine, N,N-dimethylaminopropylamine and the like.

Examples for aminoalcohols are ethanolamine, diethanolamine and N-methylethanolamine.

Preferred examples are N,N-dimethylaminopropyl amine, ethanolamine, diethanolamine and N-methylethanolamine.

In the principal resin, the amine adducted to the self-addition diepoxide produces terminal amine groups. These provide the cationic sites which largely contribute to the ready dispersibility of the principal resin in the aqueous acidic medium. The equivalent ratio of amine mixture per epoxide group of the self-addition diepoxide is from 0.75 to 1, primary and secondary amines being counted as one equivalent each.

The reaction conditions are known and typically, the reaction temperature will be about 20° C. to about 100° C., more typically about 30° C. to about 80° C., and preferably about 60° C. to about 75° C. The reaction time is typically about five minutes to about 60 minutes, more typically about ten minutes to about 40 minutes and preferably about 25 minutes to about 30 minutes.

The preferred crosslinker used in the practice of this invention are the organic polyisocyanates and, in particular, the blocked polyisocyanates. The organic polyisocyanates and the blocking agents used in the practice of this invention are typical of those used in the art, e.g., U.S. Pat. No. 4,182,831 the disclosure of which is incorporated by reference.

Useful blocked polyisocyanates are those which are stable in the dispersion systems at ordinary room temperature and which react with the resinous product of this invention at elevated temperatures.

In the preparation of the blocked organic polyisocyanates, and suitable organic polyisocyanate can be used. Representative examples are the aliphatic compounds such as trimethylene, tetramethylene, pentamethylene, hexamethylene, 1,2-propylene, 1,2-butylene, 2,3-butylene and 1,3-butylene diisocyanates; the aromatic compounds such as m-phenylene, p-phenylene, 4,4'-diphenyl, and 1,4-napthalene diisocyanates; and aliphatic aromatic compounds such as 4,4'-diphenylene methane, 2,4- or 2,6-tolylene, or mixtures thereof, 4,4'-toluidine, and 1,4-xylylene diisocyanates; and triisocyanates such as triphenyl methane -4,4',4''-triisocyanate, 1,3,5-triisocyanate benzene and 2,4,6-triisocyanate toluene and the tetraisocyanates such as 4,4'-diphenyl-dimethyl methane-2,2', 5,5'tetraisocyanate; the polymerized polyisocyanates such as tolylene diisocyanate dimers and trimers, polymethylenepolyphenylene polyisocyanates having NCO functionalities of 2 to 3, and the like.

In addition, the organic polyisocyanate can be a prepolymer derived from a polyol such as glycols, e.g., ethylene glycol and propylene glycol, as well as other polyols such as glycerol, trimethylolpropane, hexanetriol, pentaerythritol, and the like as well as monoethers, such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Preferred polyisocyanates include the reaction product of toluene diisocyanate and trimethylolpropane, the reaction product of 4,4'-diphenylene methane diisocyanate and trimethylolpropane, and 4,4'-diphenylene methane diisocyanate with glycerol; additionally, the isocyanurate of hexamethylene diisocyanate.

Any suitable aliphatic, cycloaliphatic, aromatic, alkyl monoalcohol and phenolic compound can be used as a blocking agent in the practice of the present invention, such as lower aliphatic alcohols, such as methyl, ethyl, chloroethyl, propyl, butyl, amyl, hexyl, heptyl, octyl, nonyl, 3,3,5-trimethyl-hexanol, decyl and lauryl alcohols, and the like; the aromatic-alkyl alcohols, such as phenylcarbinol, methylphenylcarbinol, ethyl glycol monoethyl ether, ethyl glycol monobutyl ether and the like; the phenolic compounds such as phenol itself, substituted phenols in which the substituents do not adversely affect the coating operations. Examples include cresol, nitrophenol, chlorophenol and t-butyl phenol.

Also, amines can be used as blocking agent like dibutylamine.

A preferred blocking agent is monopropyl ether of ethylene glycols. Additional blocking agents include tertiary hydroxyl amines, such as diethylethanolamine and oximes, such as methylethyl ketoxime, acetone oxime and cyclohexanone oxime, and caprolactam. A preferred oxime is methyl-n-amyl ketoxime.

The blocked polyisocyanates are formed by reacting sufficient quantities of blocking agent with sufficient quantities of organic polyisocyanate under reaction conditions conventional in this art such that no free isocyanate groups are present when the reaction has run its course.

Sufficient quantities of blocked polyisocyanate are incorporated into the electrodepositable coating compositions of this invention such that the deposited coating will be completely cured upon baking and there will be no free isocyanate groups remaining. Typically, about 20% by weight to about 80% by weight of blocked polyisocyanate is mixed with the modified epoxy resin, more typically about 30% by weight to about 70% by weight, preferably about 35% by weight to about 65% by weight.

Additives may be used like organic solvents, catalysts, wetting agents, conditioning agents, thickeners, rheology control agents, antioxidants, surfactants, leveling agents, or mixtures thereof.

Electrodepositable cathodic coating compositions of this invention are used in an electrodeposition process as an aqueous dispersion. Sufficient quantities of the components are used so that the concentration of the components in an aqueous bath will produce a coating on an object of sufficient thickness when processed at a sufficient voltage, time and temperature so that upon baking the coating will have the desired characteristics such as filmbuild, throwpower, corrosion resistance, chip resistance, impact resistance. Typically, the concentration in water of the components of this invention are 10% by weight to about 60% by weight, typically about 20% by weight to about 60% by weight, and preferably about 30% by weight to about 60% by weight.

The electrodeposition process typically takes place in an electrically insulated tank containing an electrically conductive anode which is attached to a direct current source. The size of the tank will depend on the size of the article to be coated. Typically the tank is constructed of stainless steel or mild steel lined with a dielectric coating such as epoxy impregnated fiberglass or polyepoxide. The electrodepositable cathodic resinous coating compositions of this invention are typically used to coat articles such as automobile or truck bodies. The typical size of an electrodeposition bath tank used for this purpose is about 60,000 gallons to about 120,000 gallons capacity.

Typically the article to be coated is connected to the direct current electric circuit so that the conductive object acts as the cathode. When the article is then immersed in the coating bath, flow of electrons from the cathode to the anode, that is, conventional current flow from the anode to the cathode, results in the particles of the dispersed cationic electrodepositable resin composition being deposited on the surfaces of the article. The particles of the dispersed resin composition are positively charged and are therefore attracted to the negative cathodic surface of the object to be coated. The thickness of coating deposited upon the object during its residence in the electric cathodic coating bath is a function of the cathodic electrodepositable resin composition, the voltage across the article, the current flux, the pH of the coating bath, the conductivity, and the residence time. Sufficient voltage is applied to the coated article for a sufficient time to obtain a coating of sufficient thickness. Typically the voltage applied across the coated article is about 50 volts to about 500 volts, more typically about 200 to about 350 volts, and preferably about 225 volts to about 300 volts. The current density is typically about 0.5 amperes per sq. ft. to about 30 amperes per sq. ft., more typically about one ampere per sq. ft. to about 25 amperes per sq. ft., and preferably about one ampere per sq. ft. The article to be coated typically remains in the coating bath for a sufficient period of time to produce a coating or film of sufficient thickness having sufficient resistance to corrosion and flexibility. The residence time or holding time is typically about 1 minute to about 2½ minutes, and preferably about 2 minutes.

The pH of the coating bath is sufficient to produce a coating which will not rupture under the applied voltage. That is, sufficient pH to maintain the stability of the coating bath so that the resin does not kick-out of the dispersed state and to control the conductivity of the bath. Typically the pH is about 4 to about 7, more typically about 5 to about 6.8, and preferably about 6 to about 6.5.

The conductivity of the coating bath will be sufficient to produce a coated film of sufficient thickness.

The desirable coatings have sufficient thicknesses to provide resistance to corrosion while having adequate flexibility. Typically, the film thicknesses of the coated objects of this invention will be about 0.4 mils to about 1.8 mils, more typically about 0.6 mils to about 1.6 mils, and preferably about 0.6 mils to about 1.0 mils.

The temperature of the coating bath is maintained, typically by cooling, at a temperature less than about 30° C.

When the desired thickness of the coating has been produced, the coated object is removed from the electrodeposition bath and cured. Typically, the electrodeposited coatings are cured in a conventional convection oven at a sufficient temperature for a sufficient length of time to cause the cross-linking composition to cross-link the resin. In the case of a blocked polyixocyanate, this would be a sufficient time and temperature to unblock the blocked polyisocyanates and allow for cross-linking of the electrodepositable resin compositions. Typically, the coated articles will be baked at a temperature of about 85.C. to about 290° C., more typically about 110° C. to about 170° C., and preferably about 120° C. to about 160° C. The coated articles will be baked for a time period of about ten minutes to about 40 minutes, more typically about ten minutes to about 35 minutes, and preferably about 15 minutes to about 30 minutes.

It is contemplated that the coated articles of the present invention may also be cured by using radiation, vapor curing, contact with heat transfer fluids and equivalent methods.

Typically, the coated articles of this invention will comprise conductive substrates such as metal, including steel, aluminum, copper, etc.; however, any conductive substrate having a conductivity similar to the aforementioned metals may be used. The articles to be coated may comprise any shape so long as all surfaces can be wetted by the electrodeposition bath. The characteristics of the article to be coated, which have an effect on the coating, include the shape of the article, the capacity of the surfaces to be wetted by the coating solution, and the degree of shielding from the anode. Shielding is defined as the degree of interference with the electromotive field produced between the cathode and the anode, thereby preventing coating composition from being deposited in those shielded areas. A measure of the ability of the coating bath to coat remote areas of the object is throwpower. Throwpower is a function of the electrical configuration of the anode and cathode as well as the conductivity of the electrodeposition bath.

The invention provides good pigment pastes or pigment dispersions, less pigment settling characteristics in the electrocoat bath, a reduced amount of the total pigment, and a low VOC-coating. The coating of the coated article exhibit good appearance, hiding, gloss, film thickness, chip impact corrosion resistance and intercoat adhesion.

EXAMPLES

Example 1

Preparation of Isocyanate Functional Acrylic Copolymer 1

427.8 g (4.97 mol) of methyl propyl ketone was charged to a reaction vessel fitted with stirrer and condensor. The vessel was heated to reflux temperature and maintained at reflux for the duration of the reaction. A blend consisting of 495.0 g (4.41 mol) styrene, 405.6 g (2.85 mol) butyl methacrylate, and 382.6 g (1.90 mol) 1-(1-isocyanato-1-methyl ethyl)-3-(1-methyl ethenyl)-benzene, hereafter referred to as TMI, was slowly added over a period of three hours. 64.1 g of tert-butyl peroctoate was added to the monomer blend to initiate the vinyl polymerization. 32.2 g of initiator along with 123.0 g of methyl propyl ketone were added one half hour after the addition of monomer was complete. The mixture was heated for an additional 1.5 hours and then cooled and collected for further modification.

Example 2

Preparation of Isocyanate Functional Acrylic Copolymer 2

231.3 g (2.03 mol) of methyl amyl ketone was charged to a reaction vessel fitted with stirrer and condensor. The vessel was heated to reflux temperature and maintained at reflux for the duration of the reaction. A blend consisting of 94.8 g (0.91 mol) styrene, 160.7 g (1.13 mol) butyl methacrylate, 144.8 g (1.13 mol) butyl acrylate, and 382.6 g (1.90 mol) TMI, was slowly added over a period of three hours. 67.2 g of 50% active tert-butyl peroxy acetate was added to the monomer blend to initiate the vinyl polymerization. 33.6 g of 50% active initiator along with 55.0 g methyl amyl ketone were added one half hour after the addition of monomer was complete. The mixture was heated for an additional 1.5 hours and then cooled and collected for further modification.

Example 3

Preparation of Isocyanate Functional Acrylic Copolymer 3

251.0 g (2.51 mol) of methyl amyl ketone was charged to a reaction vessel fitted with stirrer and condensor. The vessel was heated to reflux temperature and maintained at reflux for the duration of the reaction. A blend consisting of 294.8 g (1.60 mol) 2-ethyl-hexyl acrylate, 269.2 g (1.60 mol) cyclohexyl methacrylate, and 322.0 g (1.60 mol) TMI, was slowly added over a period of three hours. 88.6 g of 50% active tert-butyl peroxy acetate was added to the monomer blend to initiate the vinyl polymerization. 44.3 g of 50% active initiator along with 62.2 g methyl amyl ketone were added one half hour after the addition of monomer was complete. The mixture was heated for an additional 1.5 hours and then cooled and collected for further modification.

Example 4

Preparation of Modified Copolymer 1 (Grind Resin)

54.9 g (39.2 mmol; average molecular weight of 1400) of methoxy polyethylene glycol in 12.9 g toluene and 111.2 g of the isocyanate-functional acrylic prepared in accordance with Example 1 were charged to a reaction vessel fitted with a stirrer and condensor. The mixture was heated to reflux and maintained at reflux for not more than one half hour. At the end of this time, the mixture was titrated and the result indicated that all of the methoxy polyethylene glycol had reacted with the isocyanate groups. The remainder of the isocyanate functionality was reacted with 1.80 g (29.4 mmol) monoethanolamine and 3.00 g (29.4 mmol) dimethylaminopropylamine which was added while the mixture was stirred and the temperature was approximately 36° C. The temperature then rose to 42° C. and then subsided. When the exothermic reaction had ceased, the mixture was titrated. Titration revealed no remaining NCO functionality and the expected amount of amine functionality. The material was subsequently dispersed with 8.8 g of deionized water.

Example 5

Preparation of Modified Copolymer 2 (Grind Resin)

101.3 g (72.4 mmol; average molecular Weight of 1400) of methoxy polyethylene glycol in 23.8 g toluene and 205.6 g of the isocyanate-functional acrylic prepared in accordance with Example 1 were charged to a reaction vessel fitted with a stirrer and condensor. The mixture was heated to 90° C. and maintained at 90° C. for three hours, after which time titration indicated that all of the methoxy polyethylene glycol had reacted with the isocyanate groups. The reaction mixture was cooled to around 40° C. and 4.60 g (45.2 mmol) 3-(dimethylamino)propylamine and 5.5 g (27.2 mmol) 11-aminoundecanoic acid were successively added to the mixture. The mixture was heated to reflux and maintained at reflux for 15 minutes, after which time all the solid material had dissolved. The reaction mixture was cooled to around 70° C. degrees and the remainder of the isocyanate funtionality was reacted with 2.20 g (27.2 mmol) monoethanolamine, then an additional 5.0 g methyl propyl ketone was added to the mixture to decrease the viscosity.

Example 6

Black Pigment Paste 1

A black pigment paste was prepared by adding 18.19 parts by weight Raven 890H carbon black pigment (Columbian Chemicals Company, 1600 Parkwood Circle, Atlanta, Ga. 30339) to a stirred mixture consisting of 2.59 parts by weight grind resin prepared in accordance with Example 4, 72.00 parts by weight deionized water, and 7.23 parts by weight ethylene glycol monobutyl ether. The resultant mixture was stirred on cowles for about thirty minutes and milled in an attritor for ninety minutes.

Example 7

Black Pigment Paste 2

A black pigment paste was prepared by adding 18.19 parts by weight Raven 410 carbon black pigment (Columbian Chemicals Company) to a stirred mixture consisting of 2.59 parts by weight grind resin prepared in accordance with Example 5, 72.00 parts by weight deionized water, and 7.23 parts by weight ethylene glycol monobutyl ether. The resultant mixture was stirred on cowles for about thirty minutes and milled in an attritor for two hours.

Example 8

Lead Silicate Pigment Paste

A lead silicate pigment paste was prepared by adding 18.19 parts by weight Basic lead silicate 202 (Chemcentral Corporation, 7050 West 71st Street, Chicago, Ill. 60638) to a stirred mixture consisting of 2.59 parts by weight grind resin prepared in accordance with Example 5, 72.00 parts by weight deionized water, and 7.23 parts by weight ethylene glycol monobutyl ether. The resultant mixture was stirred on cowles for about thirty minutes and milled in an attritor for two hours.

Example 9

Dibutyltin Oxide Paste

A dibutyltin oxide paste was prepared by adding 18.19 parts by weight Fascat 4203 dibutyltin oxide catalyst (Atochem North America, Incorporated, 3 Parkway, Philadelphia, Pa. 19102) to a stirred mixture consisting of 2.59 parts by weight grind resin prepared in accordance with Example 5, 72.00 parts by weight deionized water, and 7.23 parts by weight ethylene glycol monobutyl ether. The resultant mixture was stirred on cowles for about thirty minutes and milled in an attritor for two hours.

Example 10

Aluminum Silicate Extender Paste

An aluminum silicate extender paste was prepared by adding 18.19 parts by weight ASP200 aluminum silicate extender (Engelhard Corporation, 101 Wood Avenue, Iselin, N.J. 08830) to a stirred mixture consisting of 2.59 parts by weight grind resin prepared in accordance with Example 5, 72.00 parts by weight deionized water, and 7.23 parts by weight ethylene glycol monobutyl ether. The resultant mixture was stirred on cowles for about thirty minutes and milled in an attritor for two hours.

Example 11

Red pigment paste

A red pigment paste was prepared by adding 38.47 parts by weight diketopyrrolopyrrole pigment (C. I. Pigment Red 254) to a stirred mixture consisting of 2.20 parts by weight grind resin prepared in accordance with Example 4, 54.00 parts by weight deionized water, and 5.33 parts by weight ethylene glycol monobutyl ether. The resultant mixture was stirred on cowles for about thirty minutes and milled in an attritor for sixty minutes.

Example 12

Preparation of Electrocoating Bath 1 and Deposition of Films

A coating composition was prepared which contained the dispersant stabilized carbon black pigment grind prepared in accordance with the present invention above. 2592 parts by weight of principle emulsion prepared in accordance with the teachings of U.S. Pat. No. 4,920,162 were mixed with 1725 parts by weight deionized water. 82.5 parts by weight of the black pigment paste prepared in accordance with Example 6 was added to the mixture and the resulting bath was heated to 32° C. Electrodeposition of the coating films on zinc phosphated steel panels was performed by immersion of the panels in the bath for about 2 minutes at a voltage of 215V. The coated panels were rinsed, then baked at 180° C. for 20-30 minutes to harden the films.

Example 13

Preparation of Electrocoating Bath 2 and Deposition of Films

A coating composition was prepared which contained the dispersant stabilized red pigment grind prepared in accordance with the present invention above. 1485 parts by weight of principle emulsion prepared in accordance with the teachings of U.S. Pat. No. 4,920,162 were mixed with 1154 parts by weight deionized water. 179 parts by weight of the red pigment paste prepared in accordance with Example 11 and 41.1 parts by weight of the dibutyltin oxide paste prepared in accordance with Example 9 were added to the mixture and the resulting bath was heated to 32° C. Electrodeposition of the coating films on zinc phosphated steel panels was performed by immersion of the panels in the bath for about 2 minutes at a voltage of 200 V. The coated panels were rinsed, then baked at 180° C. for 20-30 minutes to harden the films.

Example 14

Preparation of Electrocoating Bath 3 and Deposition of Films

A coating composition was prepared which contained the dispersant stabilized pigment grinds prepared in accordance with the present invention above. 1215 parts by weight of principle emulsion prepared in accordance with the teachings of U.S. Pat. No. 4,920,162 were mixed with 843.5 parts by weight deionized water. 38.1 parts by weight of the black pigment paste prepared in accordance with Example 7, 27.5 parts by weight of the lead silicate pigment paste prepared in accordance with Example 8, 38.9 parts by weight of the dibutyltin oxide paste prepared in accordance with Example 9, and 357 parts by weight of the aluminum silicate extender paste prepared in accordance with Example 10 were added to the mixture and the resulting bath was heated to 32° C. Electrodeposition of the coating films on zinc phosphated or bare steel panels was performed by immersion of the panels in the bath for about 2 minutes at a voltage of 215 V. The coated panels were rinsed, then baked at 180° C. for 20-30 minutes to harden the films.

Example 15

Preparation of Electrocoating Bath 4 (Control) and Deposition of Films

A coating composition was prepared with the same pigment concentration as in Example 14, but the pigment paste was prepared using a grind resin prepared in accordance with the teachings of U.S. Pat. No. 4,920,162. 1945 parts by weight of principle emulsion prepared in accordance with the teachings of U.S. Pat. No. 4,920,162 were mixed with 2073 parts by weight deionized water. 382 parts by weight of a mixed pigment paste prepared in accordance with the teachings of U.S. Pat. No. 4,920,162 and having the same relative pigment concentrations as in Example 14 was added to the mixture and the resulting bath was heated to 32° C. Electrodeposition of the coating films on zinc phosphated or bare steel panels was performed by immersion of the panels in the bath for about 2 minutes at a voltage of 215 V. The coated panels were rinsed, then baked at 180° C. for 20–30 minutes to harden the films.

The bath of Example 12 prepared with carbon black as the sole pigment was quite stable and showed no settling over a period of a week. Carbon black will often show some settling or kick-out in baths prepared with pastes using grind resins such as those described in U.S. Pat. Nos. 4,920,162, 4,780,524 and 4,661,541. This bath deposited to form a hardened film of 23 microns in thickness but was somewhat soft because of the lack of any catalyst which would accelerate the curing reaction.

The bath of Example 13 prepared with C.I. Pigment Red 254 shows that the present invention allows the introduction of organic pigments into a cathodic electrocoat system. It is quite difficult to grind organic pigments using grind resins such as those described in U.S. Pat. Nos. 4,920,162, 4,780,524 and 4,661,541. This bath deposited to form a cured glossy film of 22 microns in thickness.

The use of the present invention also affords improvements in chip resistance and scribe creep on bare steel. The results of tests run on panels from Example 14 and Example 15 (control) are summarized below.

|  | Example 14 | Example 15 |
| --- | --- | --- |
| Average Percent Paint Loss 1200 ml Shot Blast | 0.65% | 3.23% |
| Average Scribe Creep | 8.49 mm | 12.95 mm |
| Bare Steel Average Scribe Creep Zinc Phosphated Steel | 2.30 mm | 2.21 mm |

We claim:

1. A process for the preparation of amine modified copolymers as pigment dispersants for cathodic electrocoating compositions comprising the steps of
   a) polymerizing
      i) an ethylenically unsaturated monomer containing an isocyanate group with
      ii) other ethylenically unsaturated monomers having no functional group capable of undergoing a reaction with said isocyanate group to form a copolymer with isocyanate groups and
   b) reacting stepwise or simultaneously said isocyanate groups with
      iii) a compound selected from the group consisting of a polyalkyleneglycol monoalkyl ether, an amino-terminated polyalkylene glycol monoalkyl ether and mixtures thereof and
      iv) a compound containing at least a tertiary amino group and one functional group capable of undergoing a reaction with said isocyanate group and
      v) optionally, another compound having one functional group capable of undergoing a reaction with said isocyanate group.

2. A process according to claim 1, wherein in step (a) are used about 5 to about 50% by weight (i) and about 50 to about 95% by weight (ii).

3. A process according to claim 1, wherein the monomer (i) is selected from the group consisting of dimethyl-meta-isopropenyl benzyl isocyanate, vinylisocyanate, isocyanatoethyl(meth)acrylate, isopropenyl isocyanate and mixtures thereof.

4. A process according to claim 1, wherein the monomer (ii) is selected from the group consisting of acrylic or methacrylic alkyl, aryl, aralkyl, alkoxyalkyl or aryloxyalkyl esters derived from alcohols or phenols having to about 20 carbon atoms, or vinyl monomers and mixtures thereof.

5. Amine modified copolymers obtainable by the process according to claim 1.

6. An aqueous pigment dispersion comprising an amine modified copolymer according to claim 1.

7. An aqueous coating composition comprising an amine modified copolymer according to claim 1.

8. An article coated with an aqueous coating composition according to claim 7.

* * * * *